United States Patent [19]

Luttig

[11] 4,357,129
[45] Nov. 2, 1982

[54] SELF-PROPELLED BALLAST DISPENSING MACHINE

[76] Inventor: Dale Luttig, Rte. 1, Emmett, Kans. 66422

[21] Appl. No.: 177,952

[22] Filed: Aug. 13, 1980

[51] Int. Cl.³ .................... B65G 67/02; E01B 27/04; B61F 13/00
[52] U.S. Cl. ................................ 414/346; 37/104; 105/215 C; 414/537
[58] Field of Search ............... 414/340, 343, 345, 346, 414/375, 537, 572; 14/71.3; 37/104; 104/12, 2; 404/108; 105/177, 215 C; 298/27; 222/176

[56] References Cited

U.S. PATENT DOCUMENTS

| 1,754,533 | 4/1930 | Van Kirk | 414/537 X |
| 2,572,776 | 10/1951 | Smith | 404/108 |
| 3,199,133 | 8/1965 | Ramer | 14/71.3 |
| 3,624,936 | 12/1971 | Yard | 37/104 |
| 3,729,087 | 4/1973 | Bruns | 414/376 |
| 3,949,884 | 4/1976 | Despalmes | 105/177 |
| 4,009,906 | 3/1977 | Sweet et al. | 298/27 |
| 4,103,622 | 8/1978 | Theurer | 104/12 |

Primary Examiner—Robert G. Sheridan
Attorney, Agent, or Firm—Leitner, Palan, Martin & Bernstein

[57] ABSTRACT

A self-propelled machine having a frame for receiving a truck which supplies ballast to a dispensing hopper at one end of the frame. A fluid system provides the locomotion and controls for the dispensing hopper. A turntable expedites conversion of the machine between road and rail use.

14 Claims, 13 Drawing Figures

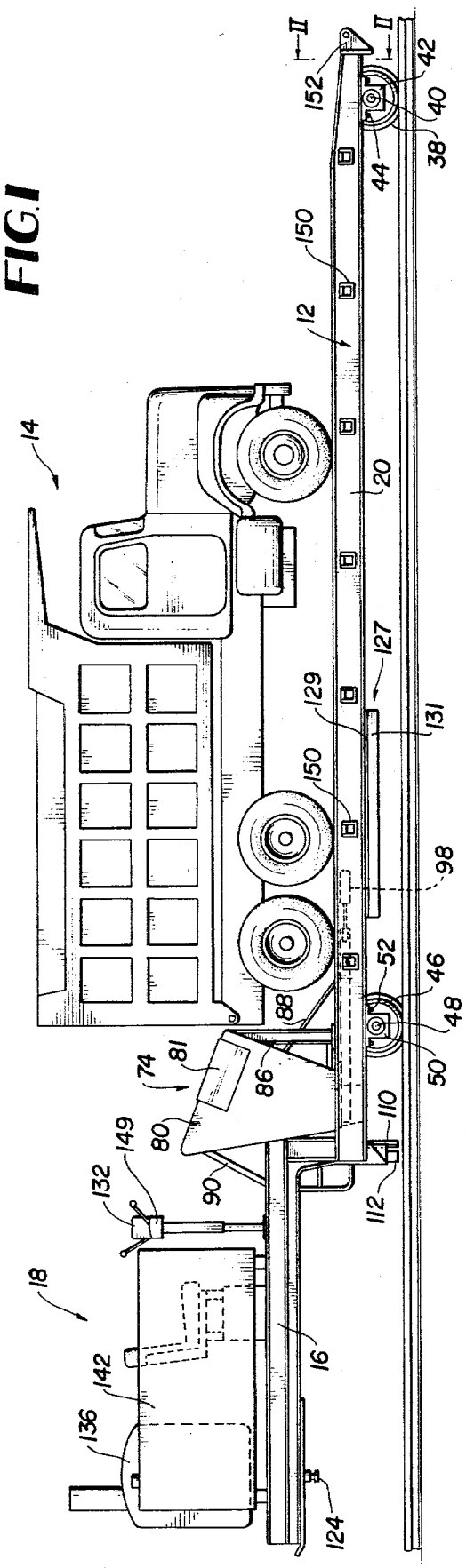

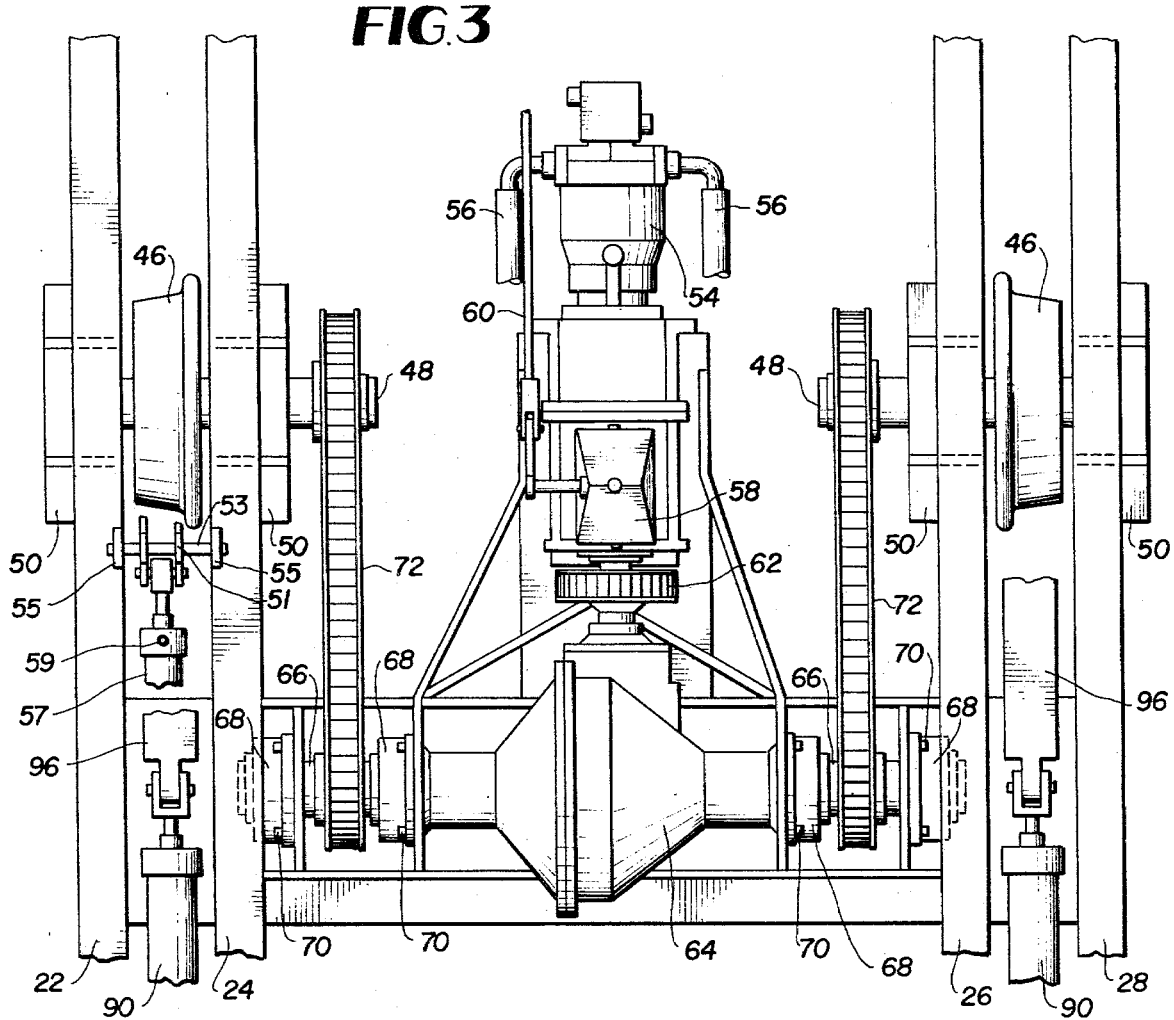

SELF-PROPELLED BALLAST DISPENSING MACHINE

BACKGROUND OF THE INVENTION

The present invention relates generally to self-propelled railroad cars and more specifically to a self-propelled ballast spreading device.

The self-propelled apparatus for handling ballast on a railbed are well-known as exemplified by U.S. Pat. No. 2,309,712. This self-propelled device removes ballast from the roadbed, cleans it and redeposits it. The desirability to make the self-propelled ballast cleaning machine capable of on and off track work is disclosed in U.S. Pat. No. 4,178,995. This concept is also shown for ballast tampering machines including a fifth wheel connection as illustrated in U.S. Pat. No. 4,103,622. The prior art as exemplified by these three patents are directed specifically to self-propelled special purpose machines for operation on existing ballast within the track.

Although there are many types of self-propelled railroad vehicles which may be transported across the road, it is generally very difficult to position these railroad vehicles onto and off of the rail. Generally, these self-propelled rail vehicles may only be applied or removed from the track at special rail yards or need special rail crossings. Similarly, some have required the use of special equipment like cranes to raise and lower the rail vehicle for the removal or insertion of road wheels to the vehicle as well as to position the rail vehicle length along the track. This additional expense of equipment and inconvenience of mounting and dismounting has made these vehicles generally unacceptable. Thus, there is a need for a self-propelled rail vehicle which is capable of being readily positioned onto and off of a rail track so as to be transported across a road.

In laying new track or spreading a large amount of ballast, the prior art generally uses a gondola car full of ballast which must be transported by an engine or other railroad work vehicle. The gondola includes a dispensing opening or device in the bottom thereof so as to dispense ballast on the track as it moves therealong. For most new track locations versus rehabilitating old track, the transporting of gondola cars full of ballast to the remote or new site is inconvenient and sometimes impossible. The prior art solution to this problem has been to provide a special over land truck which is equipped with special railroad wheels such that it may be driven across the road to a remote railroad site and then driven onto the tracks. The special truck would then dispense its ballast along the tracks. Since the special trucks are relatively expensive, only a few of them are used on a job, and consequently, long delays are experienced in providing ballast at the remote site. Another prior art method is the use of standard trucks to dump or stock pile the ballast at the remote site along side the track. Equipment would then be needed to load the ballast onto rail cars to be transported to the track to be dispensed. This method is time consuming.

Thus, there exists a need for a self-propelled railroad car capable of being transported over land to a remote site and capable of receiving ballast material from over-land vehicles so as to be continuously replenished at the remote site.

SUMMARY OF THE INVENTION

An object of the present invention is to provide a self-propelled ballast dispensing machine capable of being transported over land.

Another object of the present invention is to provide a self-propelled ballast dispensing machine whose supply may be readily replenished by over land vehicles.

Another object would be to dispense and spread the ballast at the same time.

Another object of the present invention is to provide a self-propelled ballast dispensing machine which is capable of general use on a rail spur.

A still further object of the present invention is to provide a self-propelled ballast dispensing machine having a fluid control system and drive transmission.

A still even further object of the present invention is to provide a self-propelled rail vehicle which is readily positioned onto and off of a rail track.

These and other objects of the invention are attained by providing a self-propelled ballast dispensing machine having a frame mounted low to at least two pairs of railwheels with a hopper at one end of the frame for receiving and dispensing ballast onto the track. The frame is sufficiently long to carry a truck for supplying ballast to the hopper, and sufficiently low such that the truck may be driven up onto the frame. A gooseneck portion of the frame extending above and beyond the hopper has an operator's station thereon which includes a power source whose output is connected to a fluid pump which controls the various devices on the machine as well as a drive transmission to propel the machine along the track. The hopper has a dispensing outlet which is controlled by fluid driven doors from the operator's station. Also a spreader bar is provided and controlled from the operator's station. Ramps pivotally mounted to the end of the frame to permit trucks to be driven thereon, include resilient means for maintaining the ramp above the ground unloaded, while allowing the end of the ramp to engage the ground when loaded.

To make the self-propelled ballast dispensing machine of the present invention readily positioned on or taken off of a track for over-road travel, there is provided a kingpin or fifth wheel connection to a truck tractor on the gooseneck portion of the frame, a connection for road wheels at the opposite end of the frame, a hydraulic lift device adjacent the hopper to raise and lower that end of the frame, and a turntable secured at substantially the center of gravity of the vehicle. The hydraulic lifting device includes a horizontal member which can be lowered to the track level to act as a ballast spreader in addition to being further driven to raise the frame and the rail wheels above the track and ground. The turntable extends from the bottom of the frame less than the height of the wheels, such that it does not interfere with the track during normal operation of the vehicle. The self-propelled ballast dispensing device is mounted on or removed from the track by using the lifting device in combination with the turntable and additional support structure. The support structure is placed under the turntable and used in combination with the turntables as a fulcrum and the lifting device to raise and lower first one end and then the other end of the frame to attach road wheels and the fifth wheel connection of a truck tractor. The turntable in combination with the additional support structure between it and the ground or track permits the device to be rotated from a road position with its length traverse to the track to a position with the length parallel to the truck.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a self-propelled ballast dispensing machine with a truck thereon incorporating the principles of the present invention.

FIG. 2 is a cross-sectional view taken along lines II—II of FIG. 1 illustrating the frame and wheel structure.

FIG. 3 is a top view of the fluid drive system incorporating the principles of the present invention.

FIG. 4 is a cross-sectional view of a fluid controlled dispensing hopper incorporating the principles of the present invention.

DESCRIPTION OF THE PREFERRED EMBODIMENTS

Figure 5:
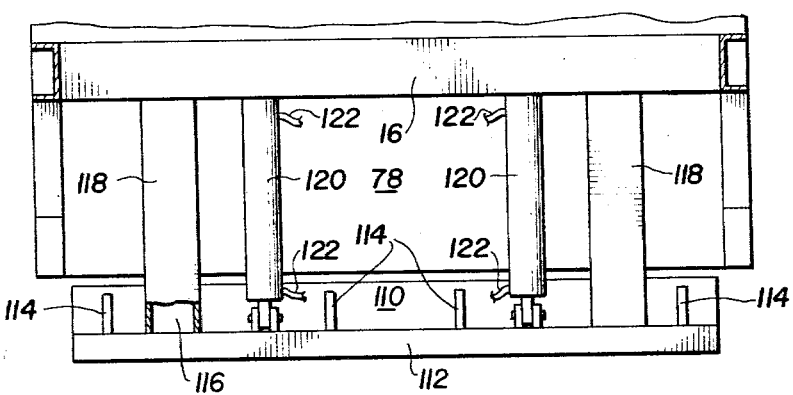
FIG. 5 is a rear view of the fluidly controlled spreader plate and jack incorporating the principles of the present invention.

As illustrated in FIG. 1, the self-propelled ballast dispensing machine 10 includes a main frame 12 capable of receiving a truck 14, which is illustrated as a dump truck, and a gooseneck or extended frame portion 16 upon which is located an operator's station 18. The main frame 12 as illustrated in the cross-section of FIG. 2 is made up of a plurality of C beams 20, 22, 24, 26, 28 and 30, interconnected by a flooring 32 and transverse struts 34. A plurality of elongated u-shaped elements 36 provide additional support for the flooring and are positioned on the upper transverse strut 34. The elements so far described are interconnected by welding. A pair of railroad wheels 38 on an axle 40 are received in bearings 42 which are mounted to the underside of the main frame 12 by fasteners 44 as illustrated in FIG. 2. A pair of rear railroad wheels 46 each on an individual axle 48 are received in bearings 50 which are attached by fasteners 52 to the main frame as illustrated in detail in FIG. 3.

The drive train for the rear wheels 46 includes a hydraulic motor 54 whose direction and speed are controlled by fluid received in hoses 56. Connected to the output of fluid motor 54 is a three speed transmission 58 which is remotely controlled by via link 60 connected to the operator's station 18. A flex coupler 62 interconnects a differential 64 to the output of transmission 58. A pair of output shafts 66 from differential 64 are received in the bearings 68 which are mounted to the main frame by fasteners 70. Drive chains 72 interconnect the output shafts 66 of the differential 64 and the axles 48 of the rear wheels 46.

As illustrated specifically in FIGS. 3 and 4, a safety brake is provided as a backup in case the hydrostatic transmission fails. The brake includes a pair of brake shoes 51 pivotally connected to pin 53 which is secured by brackets 55 to frame members 22 and 24. A hydraulic cylinder 57 is connected to the brake shoes 51 and is controlled by lines 59. A bracket 61 mounts the cylinder 57 to the frame of the vehicle.

Located at the back end of main frame 12 where the gooseneck frame portion 16 extends therefrom is a ballast hopper 74. The hopper includes a rear wall 78, a front wall 76 and a pair of side walls 80. The outlet of the hopper in the bottom thereof includes an extension of wall 78 and an extension 82 of the front wall 76. The dispensing outlet extends from the floor of the frame 12 down through the bottom of the support structure. A bumper bar 84 is provided at the top edge of the front wall 76 and is supported by a pair of verticle struts 86 and fastened to the main frame 12. Interconnected between the front wall 76 and the main frame 12 is a plate 88 which prevents any ballast which may spill from the dump truck from falling upon the hydraulic drive illustrated in FIG. 3. A pair of struts 90 interconnect the rear wall 78 and the gooseneck frame portion 16.

Figure 6:
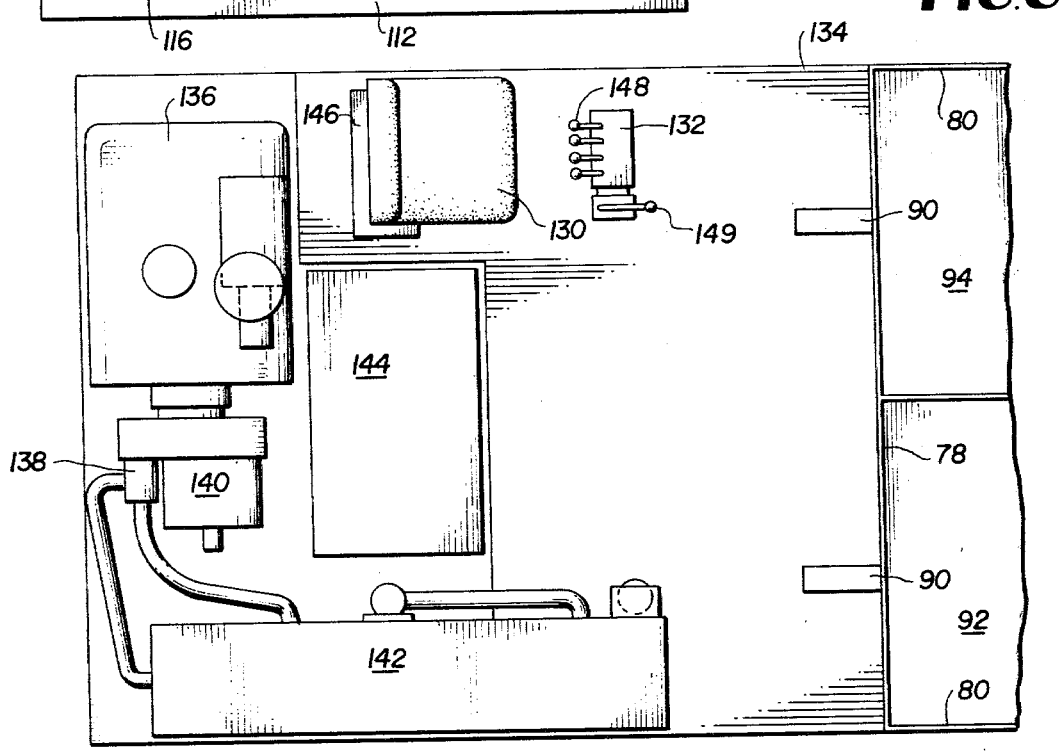
FIG. 6 is a top view of the control station of FIG. 1 incorporating the principles of the present invention.

Extending across the dispensing outlet are a pair of gates or doors 92 and 94 as illustrated in FIG. 6. Each of these doors are controlled by an individual fluid cylinder 98 and connected thereto by a rod 96 as illustrated in FIG. 4. The hydraulic cylinder 98 has a pair of lines 100 connected to the operator's station 18. The cylinders are mounted to a respective beam by bracket 102. The doors are supported on and slide along the frame beams. By using a two port cylinder 98, the amount of ballast being dispensed may be accurately controlled since the position of the doors 92 and 94 may be controlled to a multitude of positions. Similarly, by using a pair of doors 92 and 94 individually controlled, ballast may be spread on one half of the track or railbed versus the other.

The front wall 76 of the hopper is slanted down toward the dispensing outlet so as to aid the dispensing of the ballast. Similarly, the front wall 76 is shorter than the back wall 78 and has a height from the floor of the main frame 16 so as to lie below the height of the bed of the truck which contains the ballast for the hopper 74. As the body of the dump truck is raised, and the gate of the truck swings open, the ballast will fall into hopper 74. The gate may engage the rear wall 78 and form a ballast backstop for the ballast being supplied from the truck to the hopper 74.

Since dump trucks have truck beds at different heights, the lower edge of the truck bed will extend into the hopper 74 during dumping. Similarly, since these truck beds may have different widths, some provision must be made to accommodate these truck beds. As illustrated specifically in FIG. 4, each of the side walls 80 include an extension portion 81 which is part of the side wall pivotally connected at 83 thereto. A tab 85 extending from the extension portion 81 engages the interior of the side wall 80 to limit the outward pivotal motion. A bolt lock 87 is received in apertures in a flange extending substantially perpendicular to the extension portion 81 to lock it in an extended or in a closed position. Thus, it can be seen that the extension portions 81 when rotated in opposite directions will increase the width of the top of the ballast hopper 74 adjacent the front edge thereof to accommodate wider dump truck bodies.

Positioned behind the hopper 74 and the dispensing outlet is a ballast spreader or plate 110. The spreader 110 is mounted by welding to a horizontal member 112 and reinforced by braces 114, as illustrated in FIG. 5. A pair of tubular elements 116 are telescopically received in tubular guides 118 which are in turn mounted to the gooseneck frame 16. A pair of fluid cylinders 120 are also connected between the horizontal member 112 and the gooseneck frame 16. A pair of pressure lines 122 to each fluid cylinder 120 controls the position of the horizontal member 112 and the spreader plate 110 through controls at the operator's station 18. As illustrated in FIG. 1, the fluid cylinders 120 have positioned the spreader plate 110 on a pair of tracks to spread the ballast as the self-propelled ballast dispensing machine 10 moves down the track, which would be to the right in FIG. 1.

Figure 7:
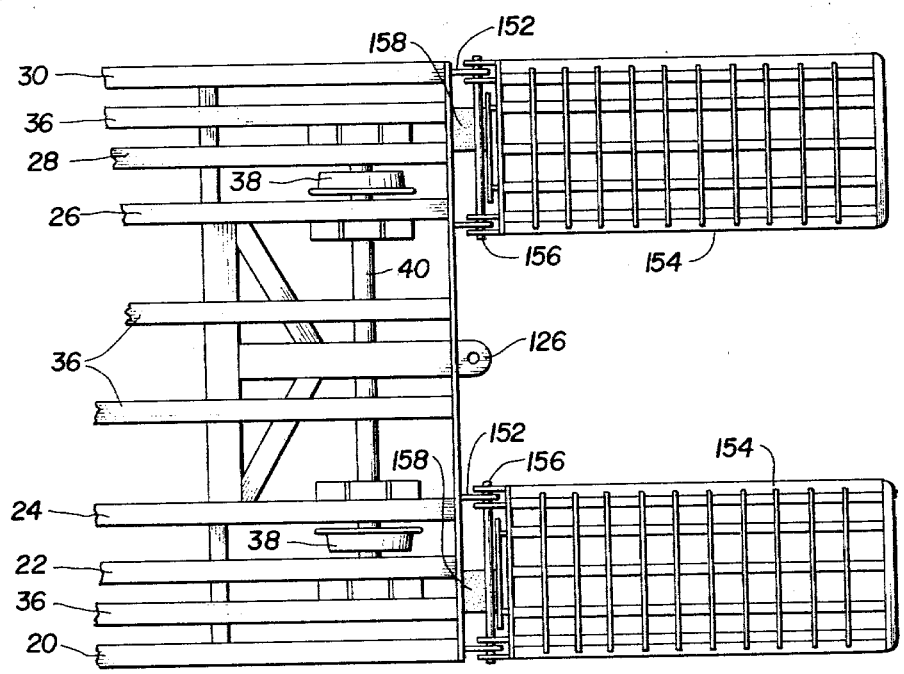
FIG. 7 is a partial top view of the front end of the machine with loading ramps incorporating the principles of the present invention.

A kingpin 124 is provided on the bottom of the gooseneck frame portion 16 for connection to a fifth wheel of a truck tractor. On the front of the main frame 12, a dolly with rubber tires could be attached for highway transportation. As illustrated in FIG. 7, a catch 126 is provided at the front end of main frame 12 to allow connection of the dolly thereto. As illustrated in FIG. 1, a turntable 127 is provided substantially at the center of gravity of the machine 10. The turntable includes a first portion 129 secured to the frame 12 and a second portion 131 rotatably connected to the first portion 129. As will be described in detail with respect to FIGS. 8-13, the turntable 127 in combination with the fluid cylinders 120 of the spreader bars assembly can be controlled to allow connection and disconnection of a truck tractor to kingpin 124 and a dolly to catch 126 as well as positioning the machine onto and off of rail tracks.

The operator's station 18 as illustrated in detail in FIG. 6 includes a seat 130 and control panel 132 positioned above a grate floor 134. By providing the grate floor, the operator may see down to the track level and monitor the dispensing and spreading of the ballast onto the track bed. Also included at the operator's station is the power source 136 which is illustrated as a diesel engine. Connected to the output of the diesel engine 136 are a fluid pump 138 and a hydrostatic transmission 140. A fluid tank or sump 142 and diesel fuel tank 144 are also shown mounted to the operator's station. Battery 146 is provided beneath the operator's seat 130. The interconnection of the fluid system from the pump 128, hydrostatic transmission 140, fluid tank 142 and control station 132 have been schematically illustrated or deleted for sake of clarity. The control panel 132 includes a plurality of control levers 148.

One of the levers 148 is used to control the hydrostatic transmission 140. By the use of a hydrostatic transmission, the output of which is connected to the fluid motor 54 of the propulsion system or drive train by fluid lines. This allows remote control of the drive train without the necessity of mechanical interconnection. Similarly, a hydrostatic transmission allows easy operation by the operator. The operator may control the speed output of the hydrostatic transmission by varying the control levers 148 and may also control the direction of the output of hydrostatic transmission to control the fluid motor 54. The operator may merely reverse the direction of the control knob and the hydrostatic transmission will automatically slow down and reverse its direction without the operator having to first bring his control knob to a stop position and then to the reverse position. One of the control levers 148 is used to control the previous described auxiliary braking system described in FIGS. 3 and 4. An accumulator (not shown) in the hydraulic line holds the oil pressure on the brakes with air pressure for a period of time. The brakes are a safety backup in case the hydrostatic transmission fails. The fluid system of the present controls is hydraulic since it may be operated in diverse temperature conditions.

The control panel 132 also includes a control knob 149 connected to link 60 for the three speed transmission 58 of the drive train. A pair of control levers 148 at control panel 132 individually control the hydraulic cylinders 98 for the hopper dispensing doors 92 and 94. A single control lever 148 is operated to control the position of hydraulic cylinders 120 to adjust the position of the spreader plate 110 and horizontal member 112. It should be noted that by using a hydrostatic transmission, a single speed output from the diesel engine 126 may drive the hydrostatic transmission 140 and associated drive train of FIG. 3 as well as the hydraulic pump 128. The transmission allows the differential in speed required for the drive train and that of the hydraulic pump 138.

By providing the operator station 18 on a gooseneck extension of the main frame 12, the operator may be positioned above the dump truck which is carried on the main frame 12. Similarly, the majority of the weight of the equipment including the diesel engine 136 and the two tanks 140 and 142 will lie on the fifth wheel connection for over land travel. It should be noted that the main frame 12 is mounted as directly as possible to railroad wheels so as to maintain the floor of the main frame 12 as low as possible. This allows self-propelled ballast dispensing machine to also be conveniently used to carry other types of equipment and to be used as a work post. Men operating along the track may easily throw equipment, for example railroad ties, on the low main frame 12. As illustrated in FIG. 1, a plurality of lashrings 150 are mounted to the main frame 12 such that equipment placed on the main frame 12 may be lashed down. With the present hydraulic system on the machine, a backhoe or other device may operate from the platform.

Extending from the front portion of main frame 12 are four brackets 152. A pair of pins 156 mount a pair of ramps 154 to the brackets 152. The ramps 154 may normally extend down to the track level to allow a truck to be driven onto the main frame 12. After the truck is on the frame, the ramps 154 may be swung up, off of the track level. Alternatively, they may be removed. To alleviate this extra time required in removing or swinging the ramps 154 up and to possibly damage the truck, a resilient means 158 is provided between the front of the main frame 12 and the back of the ramp 154. The resilient means may be an elastomeric, a spring, or other type of resilient device which is capable of maintaining the ramps 154 in an extended substantially horizontal position or at least up off of the track level in an unloading condition. When sufficient weight is applied to the ramps 154 by, for example a man standing on the ends thereof, the resilient means will allow the ramps to rotate down and a truck to be driven thereon. As is obvious, the resilient means will make loading a truck onto the main frame 112 sufficient simplier than of prior ramps. Similarly, the weight of the truck itself on coming down the ramps will automatically cause the ramps to rotate down and engage the track.

Figure 8:
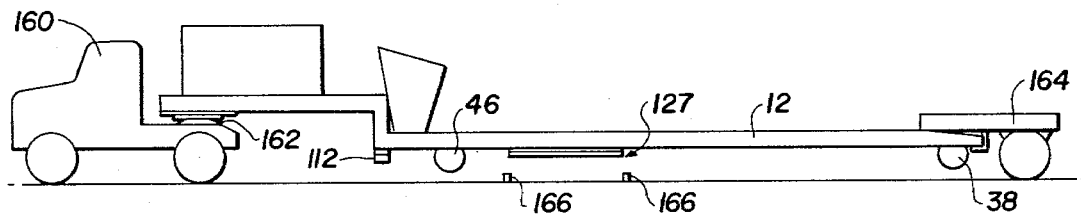
FIGS. 8–13 illustrate the method of positioning a self-propelled machine of the present invention from its road transport onto a track for propulsion there along.

The unique ability of the present machine to be readily positioned onto and off of a rail track from and to highway use will be described relative to FIGS. 8-13. As will be seen, the turntable 127 in combination with a single hydraulic lift using cylinders 120 and horizontal bar 112 will provide sufficient mechanisms to effectuate the mounting of the machine onto and off of the tracks. This minimizes the number of parts that need be used, since the hydraulic cylinders for the spreader bar 110 are already provided thereby increases the longevity of the machine and reduces its overall cost. For road transportation, as illustrated in FIG. 8, a truck tractor 160 having a fifth wheel connection 162 receives via kingpin 124 the front end of the machine 10. Connected to the opposite end of the machine is a dolly 164 having road wheels. The machine 10 thereby supported on road wheels is driven across the track such that the turntable 127 is positioned between a pair of rails 166. In this position, the length of the machine 10 and frame 12 is transverse to the direction of the tracks 166.

Figure 9:
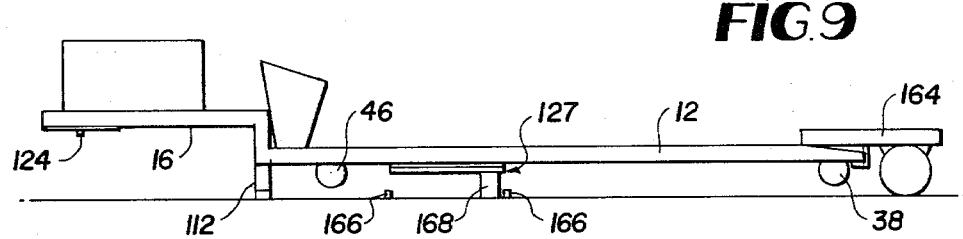
Figure 10:
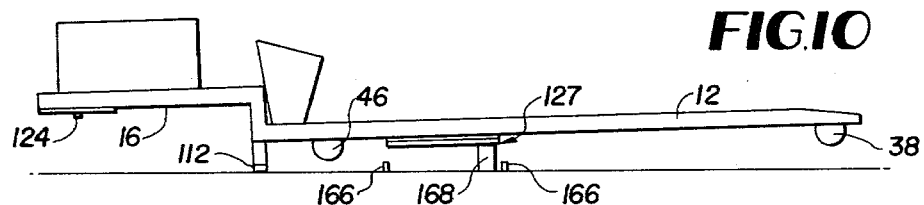
Figure 11:
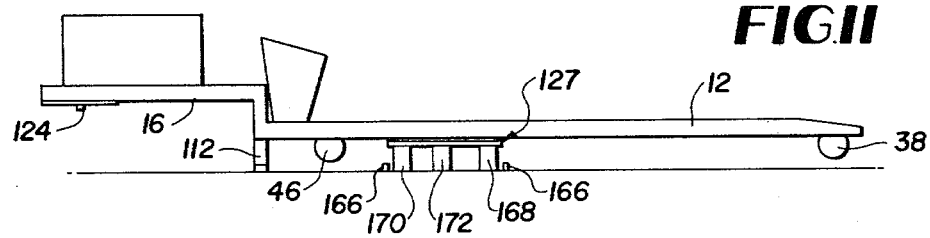

Once the machine 10 has been positioned with the turntable 127 between tracks 166, the hydraulic cylinders 120 are activated lowering the horizontal member 112 to the ground to support the portion of the frame 12 adjacent to the gooseneck portion 16. The truck 160 is then driven away disconnecting the pin 124 and the fifth wheel connection 162. The machine 10 at this point is illustrated in FIG. 9. A support 168 is then placed below the front portion of the turntable 127. The hydraulic cylinders 120 are then driven in the reverse direction allowing the front portion of the frame 12 adjacent to the gooseneck portion 16 to be lowered. Because of the position of the support 168, the frame will rotate causing the portion of the frame 12 to which the dolly 164 is connected to raise using the support 168 as a fulcrum. The dolly is then removed as illustrated in FIG. 10.

Figure 12:
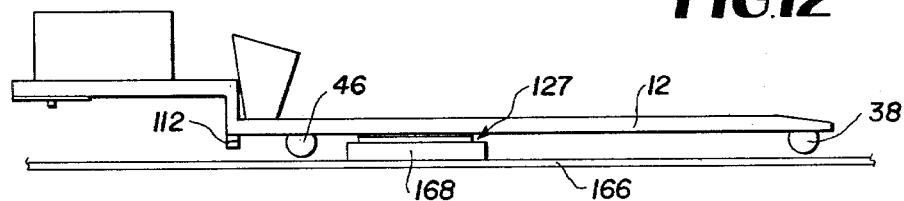

Once the dolly 164 has been removed, the hydraulic cylinders 120 are then driven to cause horizontal member 112 to engage the ground and to again raise the portion of the frame adjacent the gooseneck 16. Additional supports 170 and 172 are placed under the turntable 127. The cylinders 120 are then powered to adjust the height of the frame 12 such that it is level or horizontal on the supports 168, 170, and 172. Also it should be noted that the cylinders 120 raise the horizontal bar 112 sufficiently such that it will clear the tracks 166. The total machine 10 is then rotated approximately 90° or a sufficient amount until the length of the machine is parallel to the tracks 166. This is illustrated in FIG. 12.

Figure 13:
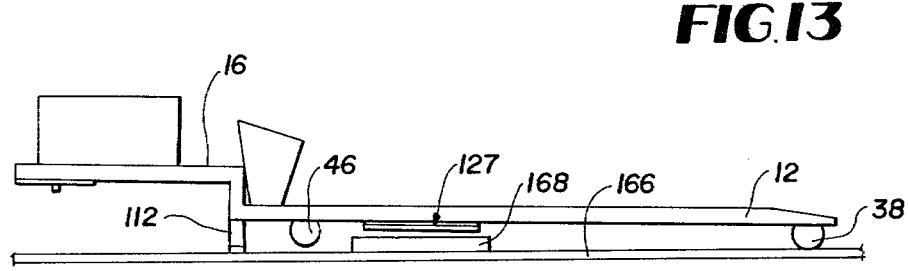

The cylinders 120 are then activated causing the horizontal bar 112 to be lowered to engage the tracks 166 and to raise the end of the frame 12 adjacent gooseneck portion 16 thereby lowering the opposite end causing the rail wheels 38 to engage the rails 166. This is illustrated in FIG. 13. The supports 168, 170, and 172 are then removed at this time and the cylinders 120 are then activated to raise the horizontal bar 112 causing the front wheels 46 to engage the track. The machine 10 is then ready to perform the ballast spreading operation as required.

Although the process has been described as using a plurality of supports 168, 170, and 172, two supports 168 and 170 may be used and positioned centered on the turntable 127.

To remove the machine 10 from the tracks and prepare it for transportation across a road, the process is generally reversed. This process includes raising the end of the frame 12 adjacent the gooseneck portion 16 and placing supports 168, 170, and 172 below the turntable 127. The frame is then lowered to a level position with the turntable 127 on the supports 168, 170, and 172. Frame 12 is then rotated so that the length lies traverse to the tracks 166. The end of frame 12 adjacent the gooseneck portion 16 is then lowered to raise the opposite end, and the dolly 164 with road wheels is attached to the raised end. The gooseneck end of the frame is then raised and a tractor 160 having a fifth wheel connection is then backed up so as to connect the kingpin 124 to the fifth wheel connection 162. The supports 168, 170, and 172 are then removed and the tractor 160 may drive away transporting the machine 10 down the road.

From the preceding description of the preferred embodiments, it is evident that the objects of the invention are attained in that a self-propelled ballast dispensing machine is provided which is capable of dispensing and spreading ballast provided by a dump truck which is easily driven on and off the machine. By providing a platform or main frame upon which dump trucks may be backed onto, no special equipment need be attached to the truck to provide ballast from a supply source to a remote site. The present device also removes the need to stock pile ballast at the truck location and the need to drive the ballast spreading device to and from this stock pile. Thus, the self-propelled ballast spreading machine of the present device may spread the ballast with no loss motion since it need not drive back and forth from the stock pile or need ancillary equipment to load the ballast other than a standard dump truck.

A unique combination of a turntable and the cylinders for the spreader bar allow the present machine to be readily placed on and off a track from and to road use.

Although the invention has been described and illustrated in detail, it is to be clearly understood that the same is by way of illustration and example only and is not to be taken by way of limitation. The spirit and scope of this invention are to be limited only by the terms of the appended claims.

What is claimed:

1. A self-propelled ballast dispensing machine comprising:
   a frame;
   a pair of wheels adjacent each end of said frame adapted for mobility on a pair of tracks;
   a hopper means at one end of said frame for receiving and dispensing ballast onto a track bed;
   said hopper means including a front wall extending substantially up from said frame but less than the height of the bed of a dump truck, a rear wall and a pair of said walls extending from said frame at least the height of said front wall;
   means on each of said side walls and adjacent said front wall for increasing the distance of separation of the top portion of said side walls adjacent said front wall to accommodate the bed of the dump truck as it pivots into said hopper means;
   said frame being sufficiently long to carry said dump truck on said frame for supplying ballast to said hopper means; and
   drive means on said frame for propelling said machine on said tracks.

2. The self-propelled ballast dispensing machine according to claim 1 wherein said distance separation increasing means includes a movable wall portion pivotably connected at its bottom to said side wall with the tops of said movable wall portions pivotably away from each other.

3. The self-propelled ballast dispensing machine according to claim 1 including ramp means pivotally connected at the other end of said frame for permitting trucks to be driven onto said frame and resilient means between said ramp means and said body for maintaining the non-pivotal end of said ramp means above the ground when unloaded and allowing the non-pivotal end of said ramp means to engage the ground when loaded.

4. The self-propelled ballast dispensing machine according to claim 1 including a fluid control system; and said hopper means includes a fluid motor means connected to said fluid control system for controlling the amount of ballast dispensed by said hopper means.

5. The self-propelled ballast dispensing machine according to claim 4 wherein said hopper means includes a dispensing outlet extending substantially the width of said frame, a pair of doors slidably mounted across said dispensing outlet, and said fluid motor means includes a pair of fluid cylinders connected to a respective door to control the position of a respective door relative to said dispensing outlet to control the amount of ballast dispensed.

6. The self-propelled ballast dispensing machine according to claim 1 wherein said frame includes a flatbed portion to which said wheels and hopper means are mounted and a gooseneck portion extending above and forward the one end of said flatbed portion to which said hopper is mounted; and further including an operator's station on said gooseneck portion.

7. The self-propelled ballast dispensing machine according to claim 6 wherein said operator's station includes a power source and fluid transmission driven by said power source; and said drive means includes drive train means interconnecting said fluid transmission and a pair of wheels at the hopper end of the machine.

8. The self-propelled ballast dispensing machine according to claim 6 further including a pin means extending down from said gooseneck portion for connection to a fifth wheel of a truck tractor; and means connected to said frame for raising and lowering said frame at the gooseneck portion to allow connection and disconnection of said frame to said truck tractor.

9. A self-propelled ballast dispensing machine according to claim 8 further including a turntable means secured to said flatbed portion of said frame at substantially the center of gravity of said machine for facilitating rotation of said frame relative to a track when supported on said track.

10. A self-propelled ballast dispensing machine according to claim 9 wherein said turntable means extends down from said frame less than the wheels so as not to engage the tracks.

11. A self-propelled ballast dispensing machine according to claim 8 further including a means on the end of said flatbed portion of said frame for receiving a pair of wheels for off-track travel.

12. A self-propelled ballast dispensing machine comprising:
a frame;
a pair of wheels adjacent each end of said frame adapted for mobility on a pair of tracks;
a hopper means at a first end of said frame for receiving and dispensing ballast onto a track bed;
means at said first end for connecting said frame to a fifth wheel of a truck tractor;
means at a second end of said frame for receiving a pair of wheels for off-track travel;
vertical means at said first end adjacent the outlet of said hopper means vertically movable relative to said frame for raising said frame above the ground to allow connection and disconnection of said frame and said truck tractor;
horizontal means connected to said vertical means and extend transverse thereto for spreading dispensed ballast when said vertical means lowers said horizontal means to said pair of tracks;
said frame being sufficiently long to carry a land vehicle on said frame for supplying ballast to said hopper means; and
drive means on said frame for propelling said machine on a pair of tracks.

13. The self-propelled ballast dispensing machine according to claim 12 wherein said frame includes a flatbed portion to which said wheels and hopper means are mounted and a gooseneck portion extending above and forward the one end of said flatbed portion to which said hopper is mounted; and said fifth wheel connecting means is on said gooseneck portion.

14. The self-propelled ballast dispensing machine according to claim 13 further including an operator's station on said goosebeck portion.

* * * * *